United States Patent [19]
Hoagland

[11] Patent Number: 5,309,241
[45] Date of Patent: May 3, 1994

[54] SYSTEM AND METHOD FOR USING AN ANAMORPHIC FIBER OPTIC TAPER TO EXTEND THE APPLICATION OF SOLID-STATE IMAGE SENSORS

[75] Inventor: Kenneth A. Hoagland, Smithtown, N.Y.

[73] Assignee: Loral Fairchild Corp., Syosset, N.Y.

[21] Appl. No.: 825,259

[22] Filed: Jan. 24, 1992

[51] Int. Cl.$^5$ .................. H04N 5/335; H04N 7/01; H04N 5/225
[52] U.S. Cl. .................. 348/222; 358/140; 348/359; 348/445
[58] Field of Search .................. 358/213.26, 213.27, 358/213.11, 140, 211, 180, 901, 225

[56] References Cited

U.S. PATENT DOCUMENTS

| | | | |
|---|---|---|---|
| 4,128,759 | 12/1979 | Hunt et al. | 358/901 |
| 4,170,400 | 10/1979 | Bach et al. | 385/119 |
| 4,426,664 | 1/1984 | Nagumo et al. | 358/213.26 |
| 4,706,122 | 11/1987 | Akiyama | 358/213.13 |
| 4,858,020 | 8/1989 | Homma | 358/213.26 |
| 4,872,057 | 10/1989 | Woolfolk | 358/211 |
| 4,897,722 | 1/1990 | Flory | 358/141 |
| 5,036,397 | 7/1991 | Nagabusa | 358/213.26 |

FOREIGN PATENT DOCUMENTS

0295728A1 5/1988 European Pat. Off. ........ H04N 3/15

OTHER PUBLICATIONS

Patent Abstracts of Japan, *Electronic Image Pickup Device*, Mihara Shinichi, Publ. No. JP4032374, Abstract Publ. Date May 15, 1992, vol. 016204.

Patent Abstracts of Japan, *Image Information Magnetic Recording/Reproducing Device and Image-Information Magnetic Recording Medium*, Kimura Kazuo et al., Publ. No. JP2170790, Abstract Publ. Date Sep. 19, 1990, vol. 014437.

*Correcting Image Distortion with Fiber-Optic Tapers*, R. A. King, A. L. Broadfoot, Bill R. Sandel, and A. Vallance Jones, 2219 Applied Optics, May 15, 1988, vol. 27, No. 10, pp. 2048-2054, New York, N.Y.

*Modern Optics*, E. B. Brown, Reinhold Publishing Corp., New York, pp. 339, 1965.

*Modern Optical Engineering*, W. J. Smith, McGraw-Hill Book Co., pp. 239-241, 1966.

*Primary Examiner*—Joseph Mancuso
*Assistant Examiner*—Wendy R. Greening
*Attorney, Agent, or Firm*—Sterne, Kessler, Goldstein & Fox

[57] ABSTRACT

An apparatus and method for allowing television systems using solid-state image sensors to be compatible with a multiplicity of television standards. Scenes conforming to a standard which specifies a format aspect ratio or a specific number of active scan lines per frame are input into the anamorphic television system. The anamorphic television system modifies these scenes to take optimum advantage of the resolution of the solid-state image sensor. The anamorphic television system alters the dimensions of the scene along the horizontal and/or vertical axis so that the scene conforms to the format aspect ratio of the solid state image sensor and/or to the number of active scan lines per frame as specified in the applicable standard. The solid-state image sensor converts the optical information into an electrical signal. This electrical signal is retrieved from the solid-state image sensor by timing circuitry. The retrieved electrical information is converted into a composite video signal which is then displayed on the display monitor. The original proportionality of the scene is recaptured by altering the vertical and/or horizontal height controls on the display monitor and/or by altering the rate at which the information is retrieved from the image sensor and displayed on the display monitor.

2 Claims, 6 Drawing Sheets

SYSTEM AND METHOD FOR USING AN ANAMORPHIC FIBER OPTIC TAPER TO EXTEND THE APPLICATION OF SOLID-STATE IMAGE SENSORS

BACKGROUND OF THE INVENTION

1. Field Of The Invention

The present invention relates generally to television systems, and more particularly to anamorphic television systems.

2. Related Art

Television systems are designed to conform to standards defining parameters such as the number of scan lines per frame, the scanning line rate, and the frame rate for generating the displayed image. These standards also specify the format aspect ratio of the displayed image. Format aspect ratio is defined as the ratio of image width to image height.

Typical standards issued by the United States Electronic Industries Association include RS-170 for systems with 525 total scan lines per frame and RS-343-A for high resolution systems with 675, 729, 875, 945 and 1023 scan lines per frame. These standards are fully described in Electronic Industries Association EIA standard RS-170, "Electrical Performance Standards—Monochrome Television Studio Facilities," revision TR-135, and Electronic Industries Associations EIA standard RS-343-A, "Electrical Performance Standards for High Resolution Monochrome Closed Circuit Television Camera." These references are hereby incorporated in their entirety into this disclosure. These standards both specify a format aspect ratio of 4:3 which has been a universally accepted aspect ratio for broadcast and cable TV as well as most industrial and military television system applications. In addition, RS-343-A A specifies 946 active scan line of video information for each frame of a 1023 line system and 809 active scan lines per frame for an 875 line system.

Some conventional television systems use electron-beam scanning of the camera tube for image pickup and of the cathode ray tube for image display. Other conventional systems use solid-state image sensors such as charge-coupled device (CCD) image sensors for image pickup.

The display device of conventional television systems can be a cathode ray tube with electron-beam scanning or a solid-state display. Solid-state displays typically consist of a matrix of light-emitting or light-controlling elements with support electronics configured to provide displayed images of television video signals.

Systems using electron-beam scanning techniques can be easily modified to conform to different scan rates, frame rates, and format aspect ratios as specified by the various standards. With electron-beam scanning, these changes typically only require adjusting the frequencies and/or amplitudes of the scan signal wave forms.

Solid-state image sensors, however, afford only limited flexibility to conform to multiple standards. These sensors are designed and fabricated with a fixed number of element rows. The number of rows is chosen to correspond to the number of scan lines per frame specified by the chosen standard. Also fixed is the width of each element row. This dimension is chosen to provide the specified format aspect ratio. The number of picture elements (pixels) per element row determines the horizontal resolution of the image sensor. A greater number of pixels per row results in improved horizontal resolution.

Since the number of rows, the width of the rows, and the number of pixels per row is fixed in solid-state image sensors, conventional television systems implementing such devices have limited flexibility. Two examples provided below illustrate the limitations of conventional solid-state image sensor television systems.

The first example illustrates why a conventional television system designed to operate at 972 active scan lines per frame with a format aspect ratio of 4:3 and 1134 pixels per scan line, will operate at reduced resolution if implemented in an application requiring only 809 active scan lines per frame. In conventional systems an opticla image is formed or relayed using a conventional lens or conventional fiber optic taper so that the useful portion of the image impinges on only 809 of the 972 sensor rows. The reduced image size is 809/972, or 83%, of the original image size. Since the image is reduced by 83% along both axes, only 83%, or 943 of the 1134 pixels along each row are used. The result is a television system which operates at reduced horizontal resolution.

The second example illustrates why a conventional television system designed to operate at a given format aspect ratio will have limited flexibility to conform to standards specifying other format aspect ratios. Consider the same conventional system as in the first example having 972 active scan lines per frame and a format aspect ratio of 4:3. If this system is used to operate with a format aspect ratio of 16:9, a reduction in the number of scan lines and a reduction in resolution along the vertical axis results. The 16:9 image has a width of 16 units and a height of 9 units. The 4:3 sensor, which can also be expressed as a 16:12 sensor $\{4\times(4:3)\}$, has a width of 16 units and a height of 12 units. When a 16:9 image impinges upon a 16:12 sensor, only 9 twelfths, or 75%, of the active scan lines are utilized. This results in a reduction of vertical resolution. Also, the loss of scan lines can result in failure to conform to a given scan-line standard.

In summary, conventional television systems using solid-state image sensors cannot effectively be used in multiple applications specifying various standards. Where limited quantities are required, the cost of redesign and fabrication of a unique solid-state image sensor for each application of the conventional television system becomes a significant factor in television system cost. Also, due to size, power, weight, and thermal constraints, conventional systems using electron-beam-scanned image sensors may not provide a viable alternative to solid-state image sensor systems.

SUMMARY OF THE INVENTION

The present invention is an apparatus and method for extending the application of solid-state image sensors to multiple video standards. According to the present invention, sensors designed to a standard specifying a particular format aspect ratio and a designated number of active scan lines per frame may be used in an anamorphic television system to receive and display scenes conforming to different standards.

The present invention operates as follows. A scene is imaged or relayed to an image sensor by an anamorphic optical device. The anamorphic optical device changes the horizontal and/or vertical dimensions of the image to conform to the format aspect ratio of the solid state image sensor and/or to the number of active scan lines per frame as specified in the applicable standard. The information in the solid state image sensor is clocked out of the solid-state image sensor and into a video amplifier and video processor. The resultant composite video signal is shown on a display monitor. The image displayed is corrected for format aspect ratio changes induced in the anamorphic optics by altering the horizontal and/or vertical height controls on the display monitor. Alternatively, to conform to new scan-lines-per-frame standards the aspect ratio of the displayed image is corrected by altering the rate at which the information is retrieved from the image sensor.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview of the Present Invention

Figure 1:
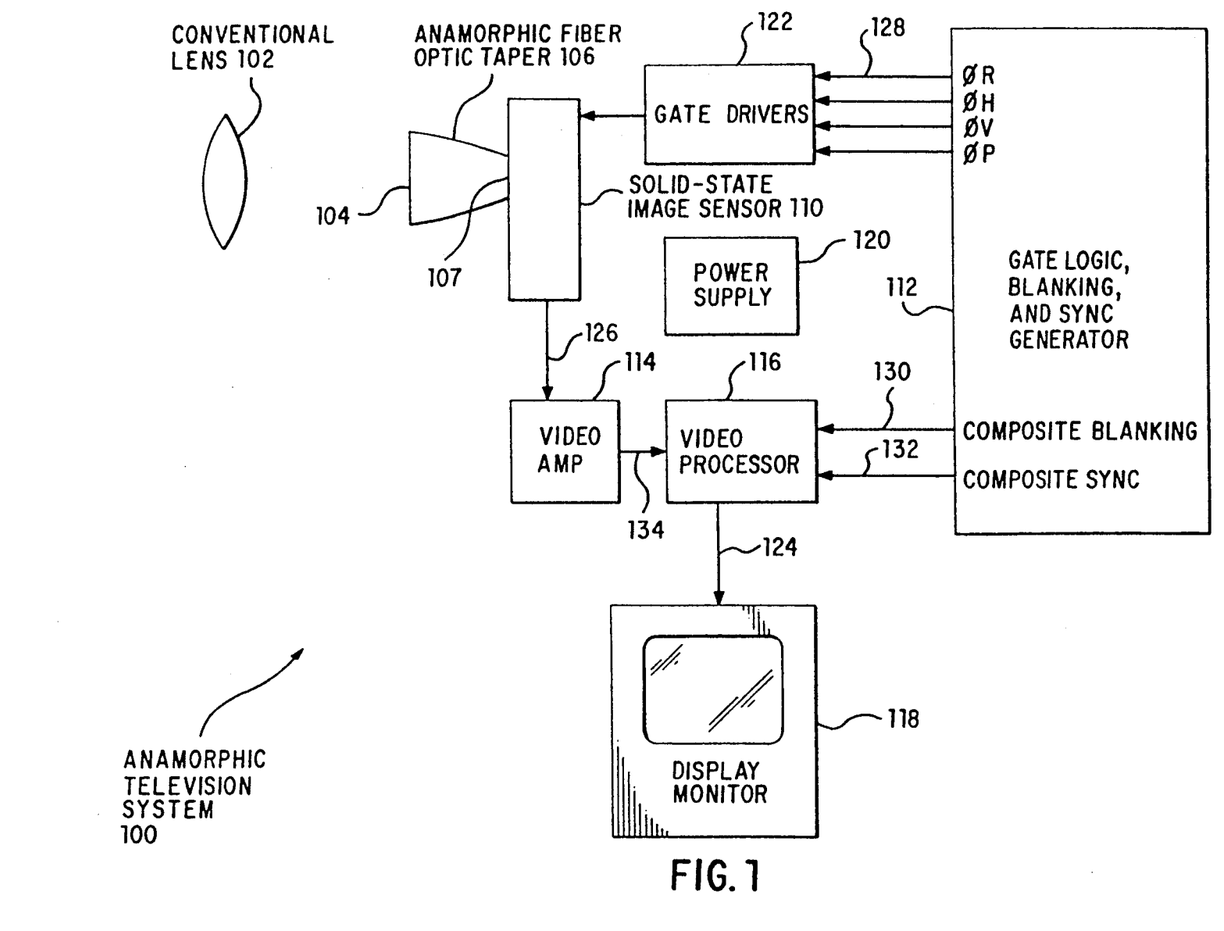
FIG. 1 is a block diagram of a representative configuration of an anamorphic television system.
Figure 2:
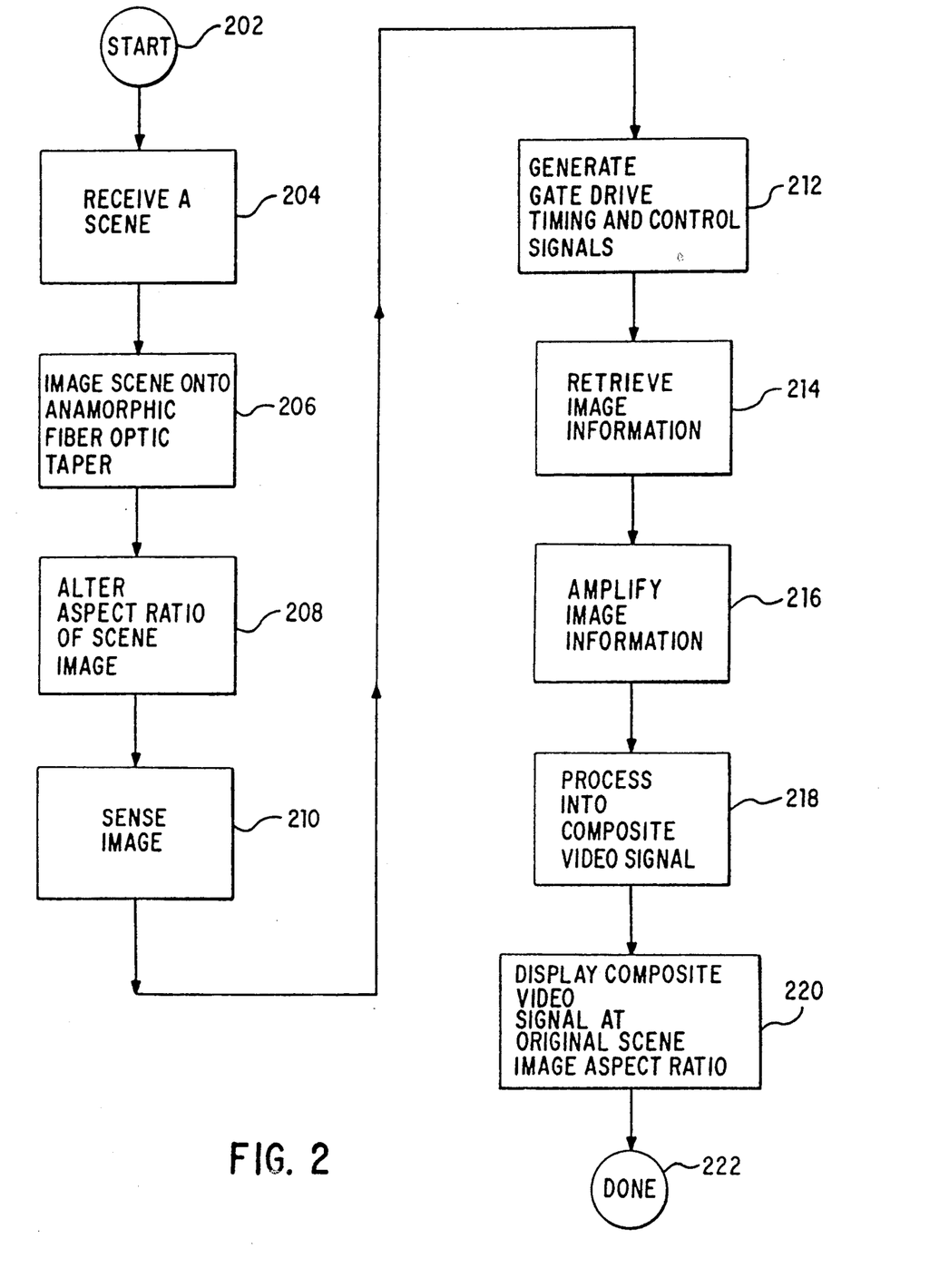
FIG. 2 is a flowchart of the basic steps of the present invention.

FIG. 1 illustrates a block diagram of an anamorphic television system 100 of the present invention. The anamorphic television system 100 includes common, off-the-shelf electrical components. FIG. 2 illustrates a flowchart which represents the operation of the anamorphic television system 100. The operation of the anamorphic television system 100 shall now be described. In a step 204, a scene is received by an anamorphic television system 100. In a step 206, conventional lens 102 images the scene onto an input face 104 of an anamorphic fiber optic taper 106.

In a step 208, the anamorphic fiber optic taper 106 alters the aspect ratio of the scene image. Specifically, according to a first embodiment of the present invention, the anamorphic fiber optic taper 106 changes the dimensions of the scene image on the input face 104 to conform to the height and width of a solid-state image sensor 110 that receives the image at an output face 107. According to a second embodiment of the present invention, the taper 106 alters the height of the scene image to conform to the height of the number of solid-state image sensor element rows that corresponds to the desired number of scan lines per frame. As a result of the alteration of the scene image height, the aspect ratio of the image at the image sensor is altered as well.

Unlike a non-anamorphic fiber optic taper used in prior art television systems, the anamorphic fiber optic taper 106 of both embodiments does not change the image size proportionally along the horizontal axis and vertical axis. This feature allows the anamorphic television system 100 to be adaptable to various standards specifying different format aspect ratios and/or different numbers of scan lines per frame without loss of resolution.

In a step 210, the image output by the anamorphic fiber optic taper 106 is sensed by the solid-state image sensor 110. In a step 212, a gate logic, blanking, and sync generator 112 generates timing and control signals 128 necessary to retrieve video-signal image information 126 from the solid-state image sensor 110. These control signals are driven in by a gate driver 122. In a step 214, the image information 126 is retrieved from the solid state-image sensor 110. In a step 216, the image information 126 retrieved from the solid-state image sensor 110 is amplified by a video amplifier 114. In a step 218, a video processor 116 processes the amplified image information 134 into a composite video signal 124 using composite blanking 130 and composite synchronization (sync) 132 signals. In a step 220, the composite video signal 124 is viewed on a display monitor at the original scene image aspect ratio. The anamorphic television system is powered by a power supply 120.

As noted above, the present invention includes two embodiments. According to the first embodiment, the anamorphic television system 100 accommodates changes in format aspect ratio. According to a second embodiment, the anamorphic television system 100 accommodates changes in the number of active scan lines per frame. The first and second embodiments of the present invention are discussed separately below.

2. Accommodating Changes in Format Aspect Ratio

Figure 3:
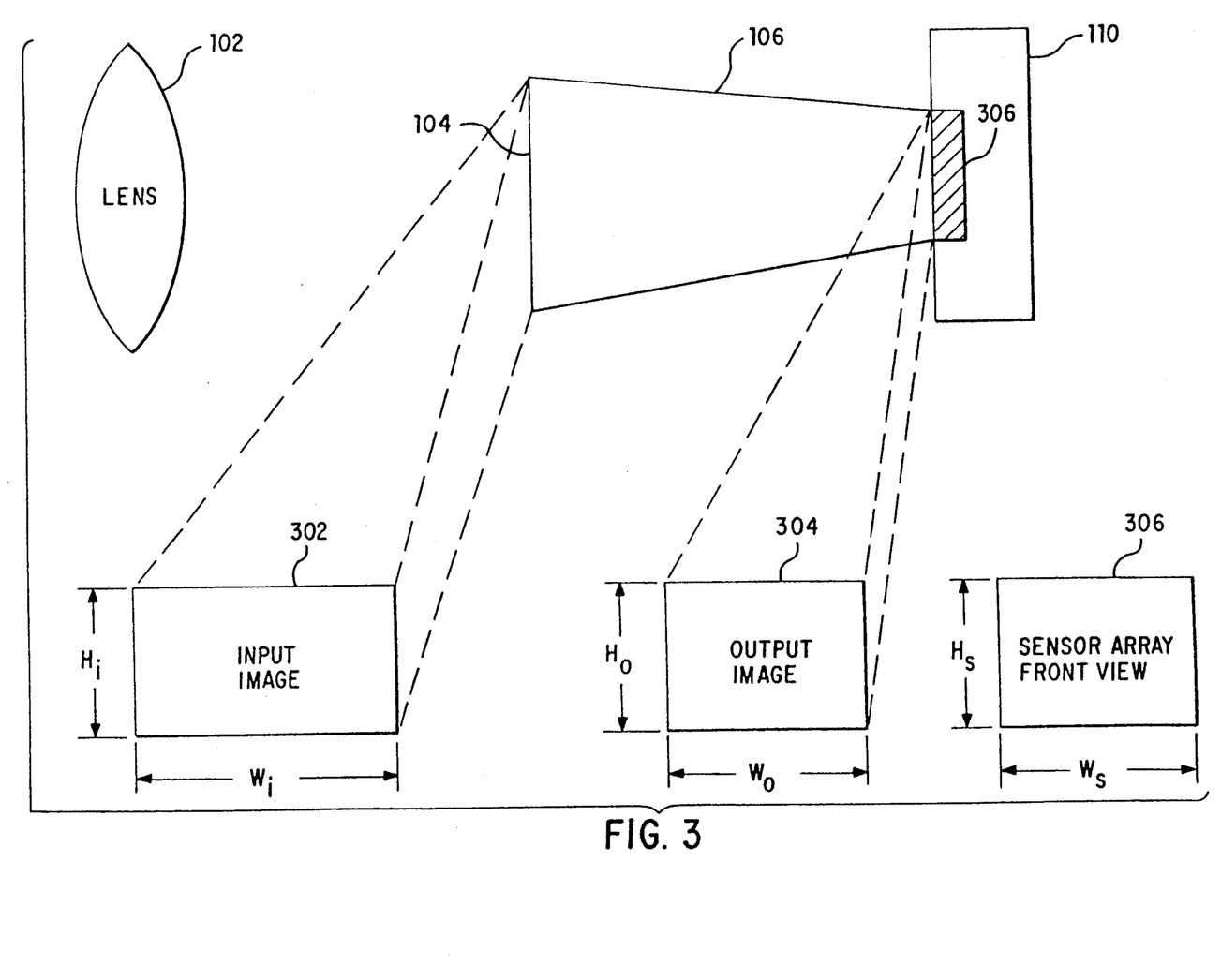
FIG. 3 illustrates the changes in image dimensions occurring in an embodiment of the present system.
Figure 4:
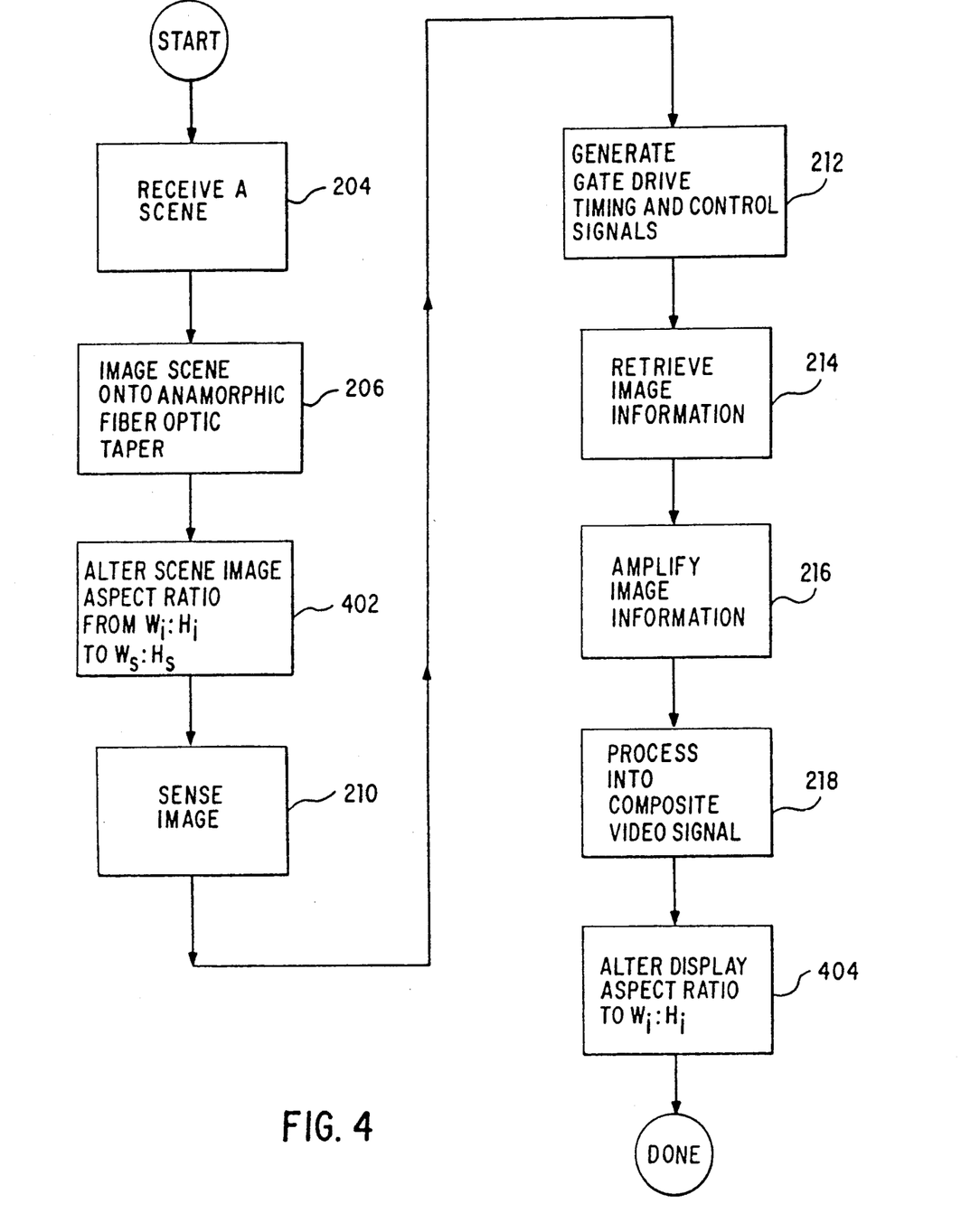
FIG. 4 is a flowchart of the basic steps of an embodiment of the present invention.

FIG. 3 illustrates the lens 102, anamorphic fiber optic taper 106, and solid state image sensor 110 in greater detail. In FIG. 3, note that the sensor 110 includes a sensor element array 306 having a height, Hs, and a width, Ws. FIG. 4 illustrates a flowchart which represents the operation of the anamorphic television system 100 according to the first embodiment. Note that FIGS. 2 and 4 are the same, except for steps 402 and 404 in FIG. 4. According to the first embodiment, a scene with a given format aspect ratio can be input to the solid-state image sensor 110 that has been designed to a different format aspect ratio.

The operation of the anamorphic television system 100 according to the first embodiment shall now be described. Referring to FIGS. 3 and 4, in a step 204, an optical scene is received by the conventional lens 102. In a step 206, the conventional lens 102 images the scene onto the input face 104 of the anamorphic fiber optic taper 106. The imaged scene is also called an input image 302. In a step 402, input image 302 height, Hi, and/or input image 302 width, Wi, are changed by the anamorphic fiber optic taper 106 to conform to the height, Hs, and width, Ws, of the solid-state image sensor's 110 sensor element array 306. This change serves to alter the scene image aspect ratio Wi:Hi to conform to the solid-state image sensor aspect ratio Ws:Hs. In a step 210, the solid-state image sensor 110 senses the image from the anamorphic fiber optic taper 106. This image from the anamorphic fiber optic taper 106 is called an output image 304.

The format aspect ratio of the input image 302 is defined by the ratio of the input image 302 width, Wi, to the input image 302 height, Hi, or Wi:Hi. Similarly, the format aspect ratio of the output image 304 is defined as the ratio of the output image 304 width, Wo, to the output image 304 height, Ho, or Wo:Ho. As a result of the change in input image 302 height and/or width that occurs in step 402, the output image 304 has a format aspect ratio different from the format aspect ratio of the input image 302. The output image 304 is therefore distorted along one of two orthogonal axes—either the vertical axis or the horizontal axis. The output image 304 appears either "stretched" vertically (taller and narrower) or "stretched" horizontally (shorter and wider).

Because the dimensions Ho and Wo of the output image 304 are identical to the dimension Hs and Ws of the solid-state image sensor 110 sensor array 306, all of the element rows and all of the picture elements (pixels) along each element row are used. This enables the anamorphic television system 100 to take advantage of the full resolution of the solid-state image sensor 110.

In a step 212, the gate logic, blanking, and sync generator circuitry 112 generates the timing and control signals 128. In a step 214, image information 126 is retrieved from the solid-state image sensor 110 and transferred to the video amplifier 114. In a step 216, the video amplifier 114 amplifies the image information 126. In a step 218 the video processor 116 processes the amplified image information 134 from the video amplifier 114 into the composite video signal 124 using composite blanking 130 and composite sync 132 signals.

The composite video signal 124 represents the output image 304 sensed by the solid-state image sensor 110. This output image 304 has a format aspect ratio which is different from that of the input image 302 which it represents. In a step 404, this distortion is compensated for by adjusting the horizontal or vertical dimension of the video image on the display monitor 118. The dimensions of the video image on the display monitor 118 are adjusted so that its format aspect ratio is the same as that of the input image 302. The dimensions of the video image are adjusted by adjusting display monitor 118 controls for horizontal width and vertical height.

Two examples of format aspect ratios are high definition television (HDTV) images which have a format aspect ratio of 16:9 and standard television images with a format aspect ratio of 4:3. The format aspect ratio of standard TV can also be expressed as 12:9.

The difference between the HDTV and standard TV format aspect ratios can be used to illustrate this first embodiment of the anamorphic television system 100. Referring now to FIGS. 1, 3 and 4, this example demonstrates how the anamorphic television system 100 using a solid-state image sensor 110 designed to conform to the standard TV format aspect ratio of 4:3 (i.e., 12:9) can be used to televise an HDTV scene with a format aspect ratio of 16:9.

In step 206, the HDTV scene is input image 302 which is imaged by the conventional lens 102 onto the input face 104 of the anamorphic fiber optic taper 106. The anamorphic fiber optic taper 106 is selected so that the height, Ho, and width, Wo, of the output image 304 are the same as the height Hs and width Ws of the sensor array 306. Selection of the taper 106 is made by specifying input image 302 dimensions, output image 304 dimensions and a proportionality factor defining the ratio of input/output image magnification for the horizontal and vertical axes.

In step 402, the anamorphic fiber optic taper 106 compresses the image along the horizontal axis with respect to the vertical axis. The output image 304 has the same dimensions as the sensor array 306 and hence a format aspect ratio of 12:9. In other words, the HDTV input image 302 with a width of 16 units and a height of 9 units is compressed horizontally in step 402 so that the output image 304 has a width of 12 units. The output image 304 appears narrower than the original HDTV input image 304. The output image 304 impinges on all elements of the sensor array 306 allowing the anamorphic television system 100 to take advantage of the full solid-state-image-sensor 110 resolution.

In step 212, the gate logic, blanking, and sync generator 112 generates the timing and control signals 128. In step 214, the image information 126 is retrieved from the solid-state image sensor 110. In step 216, the image information 126 is amplified. In step 218, the video processor 116 processes the amplified image information 134 signal to form the composite video signal 124.

The composite video signal 124 sent to the display monitor 118 corresponds to the output image 304 that is sensed by the solid-state image sensor 110. This output image 304 has a modified format aspect ratio of 12:9. It appears narrower than the original HDTV scene which it represents. In step 404, the horizontal dimension of the video image on the display monitor 118 is adjusted to the full display width, or 16 relative units. The vertical dimension of the video image on the display monitor 118 is reduced to 9/12, or 75% of its normal display height. These adjustments compensate for the distortion of output image 304. Image reduction is accomplished by adjusting the vertical height control of the display monitor 118.

3. Accommodating Changes in the Number of Scan Lines per Frame

In the second embodiment of the present invention, the anamorphic television system 100 enables a single solid-state image sensor design to be applied to standards requiring different numbers of scan lines per frame. According to the second embodiment, a solid-state image sensor designed with the number of element rows necessary to conform to the number of scan lines per frame as specified by the chosen standard is used to display a scene conforming to a standard specifying a lesser number of scan lines per frame.

Figure 5:
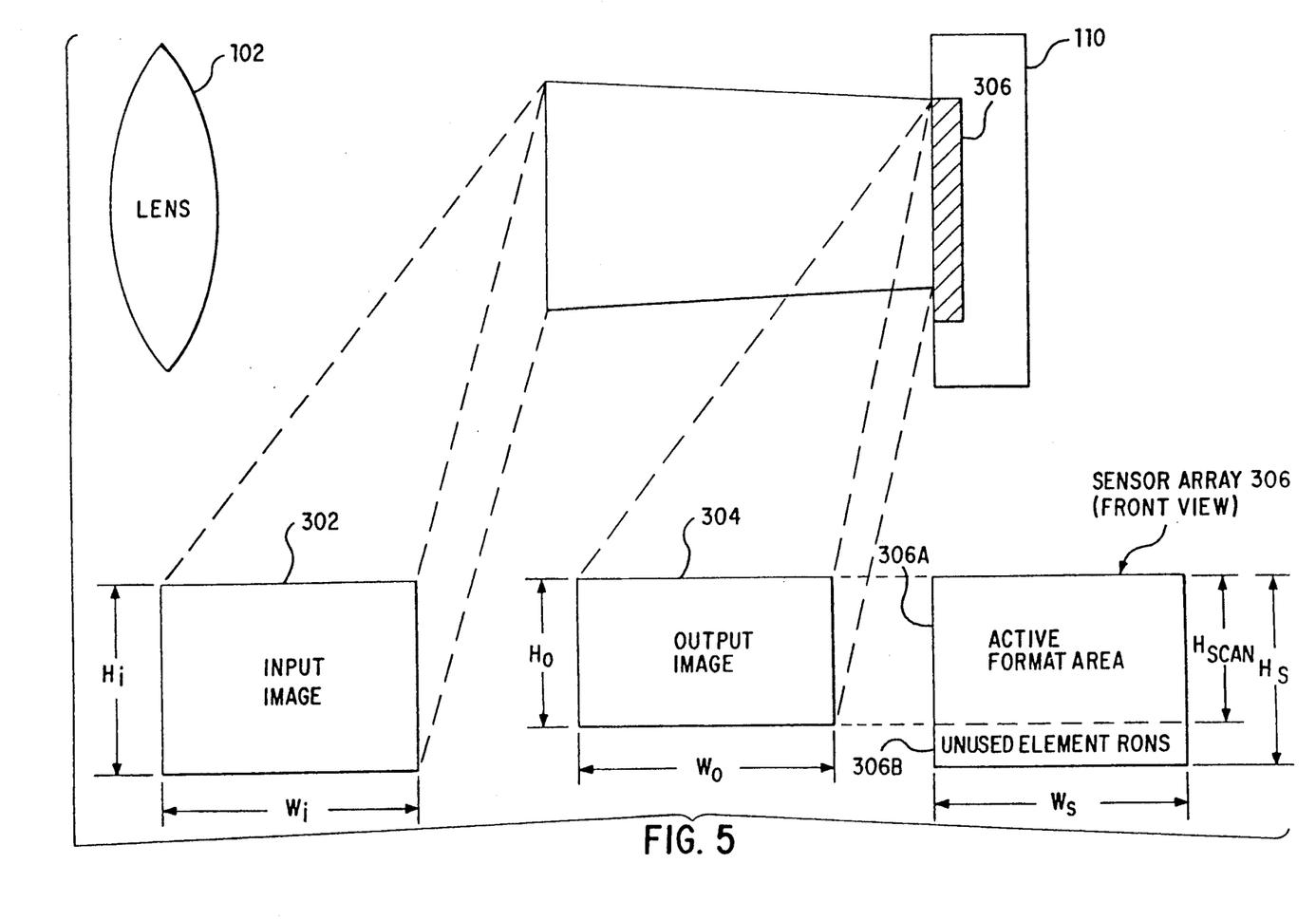
FIG. 5 illustrates the changes in image dimensions occurring in an embodiment of the present system.
Figure 6:
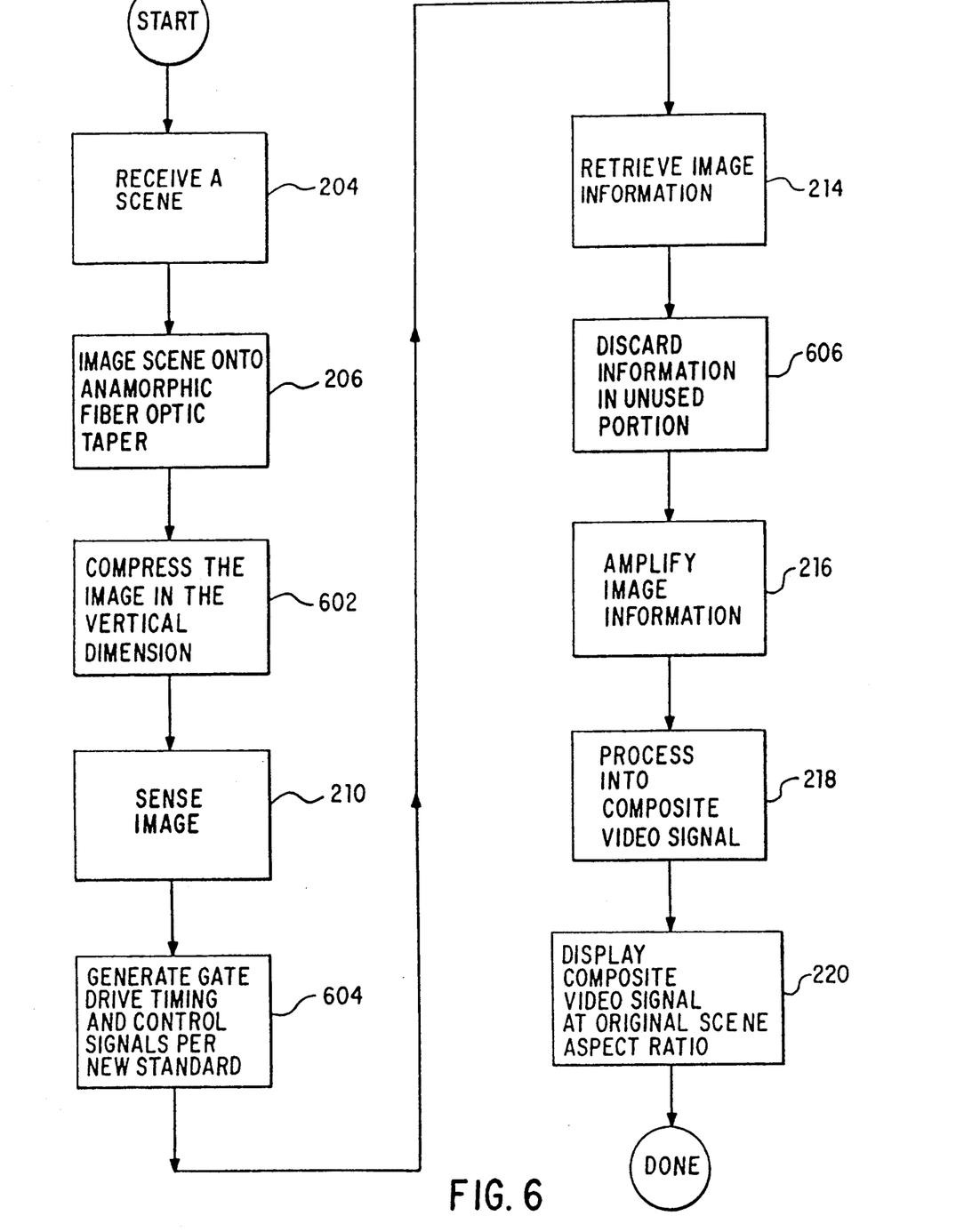
FIG. 6 is a flowchart of the basic steps of an embodiment of the present invention.

FIG. 5 illustrates the lens 102, the anamorphic fiber optic taper 106 and the image sensor 110 of the second embodiment. FIG. 5 illustrates the transformation of an input image 302 into an output image 304. FIG. 6 illustrates a flowchart which represents the operation of the anamorphic television system 100 according to the second embodiment. The operation of the anamorphic television system 100 according to the second embodiment shall now be described. In step 206, the conventional lens 102 images a scene onto the input face 104 of an anamorphic fiber optic taper 106. In a step 602, the anamorphic fiber optic taper 106 compresses the scene in the vertical direction so that the height, Ho, of the output image 304 conforms to the height, Hscan, of the number of element rows equal to the number of active scan lines per frame specified by the new standard. The width Wo of the output image 304 is the same as the width, Ws, of the sensor array 108. As a result of the compression along the vertical axis, the output image 304 appears shorter and wider.

In step 210, the solid-state image sensor 110 senses the output image 304. The area of the output image 304 (Ho×Wo) defines an active format area 306A (Hscan×Ws) of the solid-state image sensor 110. The active format area 306A is defined as the utilized area of the image sensor 110. Since the output image does not impinge on all element rows of the image sensor 110, there remain unused element rows 306B.

In a step 604, the gate logic, blanking and sync generator 112 generates the timing and control signals 128 to clock the information out of the element rows at the rate specified by the new standard. In step 214, the image information in the active format area 306A is retrieved. In a step 606, the information in the unused element rows 306B is dumped to an on-chip drain. In a step 216, the image information 126 from the active format area 306A is amplified in the video amplifier 114. In step 218, the amplified video information 134 is processed into the composite video signal 124 using the composite blanking 130 and composite sync 132 signals.

In a step 220, the composite video signal 124 is displayed on the display monitor 118. Because the timing and control signals clock the information out of the active format area 306A at the rate specified by the new standard, that information is displayed at the original scene aspect ratio on the full vertical height and full horizontal width of the display monitor 118. As a result, the compression of the input image 302 in the vertical direction is compensated for when the video signal 124 is displayed on the display monitor 118.

An example of a specific application of the anamorphic television system 100 will serve to illustrate this second embodiment. Referring again to FIGS. 1, 5 and 6, a CCD image sensor, such as the Texas Instruments type TC-217, is used as the solid-state image sensor 110. The TC-217 is designed with a 4:3 format aspect ratio and has 1134 picture elements (pixels) along each scan line. The TC-217 can be operated to provide 972 active scan lines per frame of video information. This is slightly greater than the 946 lines specified by the RS-343-A specification for a 1023 line system.

In this example, the anamorphic television system 100 will utilize the TC-217 as the solid-state image sensor 110 to operate with 809 active scan lines per frame and a format aspect ratio of 4:3 in accordance with RS-343A standards. In step 602, the anamorphic fiber optic taper 106 compresses the input image 302 along the vertical axis so the height of the output image 304, Ho, conforms to the height of 809 sensor element rows—the number of active scan lines per frame. The result is an output image 304 whose height, Ho is 809/972, or 83%, of the input image 302 height.

In step 604, the gate logic, blanking, and sync generator 112 generates the timing and control signals 128 to clock the 809 lines of the active format 306A out of the solid state image sensor 110 at the 26.25 kHz rate specified in the RS-343A specification. In step 606, the unused lines are dumped by high speed clocking to an on-chip drain.

The new active format area 306A has a format aspect ratio greater than 4:3 as a result of the reduced height, Hscan, of the used area. The 809 lines of visual information in the solid-state image sensor 110 are clocked out at the rate specified by RS-343A to fill the display screen of the display monitor 118 which has a format aspect ratio of 4:3. As a result, the reduction in height of original image is compensated for when the image is displayed on the display monitor 118.

4. Conclusion

In summary, the present invention is a system and method for expanding the utility of television systems using solid state image sensors. It allows television systems designed to specific format aspect ratios or to a specific number of active scan lines per frame to effectively televise images requiring different specifications. The invention utilizes anamorphic optical devices to alter the input image dimensions disproportionately along either the vertical or the horizontal axis. As a result of this alteration in dimensional proportion, greater utilization of the solid-state image sensor resolution can be achieved.

Dimensional distortion in the image inherent in the anamorphic optical device is compensated for when the image is displayed. This compensation occurs by altering the vertical height and/or horizontal width of the image when displayed. Alternatively, the rate and timing of the image retrieval from the solid-state image sensor is altered to conform to different scan-rate standards.

Additionally, a combination of the first two embodiments can be implemented to compensate for dimensional distortion in the image inherent in the anamorphic optical device. This compensation occurs by altering the vertical height and/or width of the image when displayed, and by altering the rate and timing of the image retrieval from the solid-state image sensor to conform to different scan-rate standards.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For example, an anamorphic lens may be used to change the input image size in place of the conventional lens 102 and anamorphic fiber optic taper 106 combination. Alternatively, the anamorphic television system could be used with a conventional lens and an image intensifier which is coupled by anamorphic fiber optics to an image sensor. This alternative is useful in low-light situations. Also, the scene could be generated using a phosphorescent screen.

In addition, the display monitor described in the preferred embodiments can be either a cathode-ray tube with electron-beam scanning or a solid-state display device.

What is claimed is:

1. An anamorphic television system for allowing a solid-state image sensor to be used with scenes conforming to a multiplicity of television standards, the system comprising:
   (a) an anamorphic fiber optic taper configured to disproportionately alter dimensions of the senes to form an interim image wherein said anamorphic fiber optic taper comprises means for compressing said image in order to increase image intensity;
   (b) a solid-state image sensor for receiving said interim image and converting optical information of said interim image into electrical information;
   (c) means for generating timing and control signals necessary to retrieve said electrical information from said solid-state image sensor;

(d) means for transforming said electrical information into a video signal; and (e) means for displaying said video signal.

2. A method for allowing a television system designed with a solid state image sensor to be used with a solid state image sensor to be used with scenes conforming to a multiplicity of television standards comprising the steps of:
 (a) disproportionately alter horizontal and vertical dimensions of the scene to from an interim image having image disproportionality using an anamorphic fiber optic taper;
 (b) converting said interim image into electrical information;
 (c) generating timing and control signals necessary to retrieve said electrical information;
 (d) retrieving said electrical information;
 (e) transforming said electrical information into a video signal;
 (f) displaying said video signal; and
 (g) altering at least one of the horizontal and vertical dimensions of said displayed video signal to compensate for said image disproportionality.

* * * * *